(12) United States Patent
Napper et al.

(10) Patent No.: US 8,090,203 B2
(45) Date of Patent: *Jan. 3, 2012

(54) SYSTEM FOR DETERMINING DIGITAL INK ORIENTATION

(75) Inventors: Jonathon Leigh Napper, Balmain (AU); Paul Lapstun, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,131

(22) Filed: Jan. 9, 2011

(65) Prior Publication Data

US 2011/0103690 A1     May 5, 2011

Related U.S. Application Data

(63) Continuation of application No. 12/618,747, filed on Nov. 15, 2009, now Pat. No. 7,894,671, which is a continuation of application No. 10/531,733, filed as application No. PCT/AU03/01342 on Oct. 10, 2003, now Pat. No. 7,630,553.

(30) Foreign Application Priority Data

Nov. 5, 2002   (AU) ................................ 2002952483

(51) Int. Cl.
*G06K 9/00*     (2006.01)
(52) U.S. Cl. ........................................ 382/187; 382/119
(58) Field of Classification Search .................. 382/187, 382/119
See application file for complete search history.

(56) References Cited

U.S. PATENT DOCUMENTS

| | | | |
|---|---|---|---|
| 4,727,588 A | 2/1988 | Fox et al. |
| 4,864,618 A | 9/1989 | Wright et al. |
| 4,894,664 A | 1/1990 | Tsung Pan |
| 5,051,736 A | 9/1991 | Bennett et al. |
| 5,477,012 A | 12/1995 | Sekendur |
| 5,652,412 A | 7/1997 | Lazzouni et al. |
| 5,661,506 A | 8/1997 | Lazzouni et al. |
| 5,692,073 A | 11/1997 | Cass |
| 5,730,602 A | 3/1998 | Gierhart et al. |
| 5,740,273 A | 4/1998 | Parthasarathy et al. |
| 5,852,434 A | 12/1998 | Sekendur |
| 6,076,734 A | 6/2000 | Dougherty et al. |

(Continued)

FOREIGN PATENT DOCUMENTS

EP     0176715 A     4/1986

(Continued)

OTHER PUBLICATIONS

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

(Continued)

*Primary Examiner* — Hadi Akhavannik

(57) ABSTRACT

A system for determining the orientation of digital ink is provided having a sensing pen and a processor. The system measures the orientation of the pen during writing by the pen on a surface printed with tags. Each tag encodes data on an identity of the surface associated with a digital description of the surface and on the respective location of that tag on the surface. The digital ink is generated by associating the digital description with the data encoded by the tags sensed by the pen during said writing. The orientation of the digital ink is determined using the measured orientation of the pen.

5 Claims, 3 Drawing Sheets

U.S. PATENT DOCUMENTS

| | | | |
|---|---|---|---|
| 6,215,901 | B1 | 4/2001 | Schwartz |
| 6,226,404 | B1 | 5/2001 | Ikebata |
| 6,964,374 | B1 | 11/2005 | Djuknic et al. |
| 7,068,821 | B2 | 6/2006 | Matsutani |
| 2004/0086181 | A1 | 5/2004 | Wang et al. |

FOREIGN PATENT DOCUMENTS

| | | |
|---|---|---|
| GB | 2306669 A | 5/1997 |
| JP | 07-182450 | 7/1995 |
| JP | 09097311 | 4/1997 |
| JP | 10-340316 | 12/1998 |
| WO | WO 99/18487 A2 | 4/1999 |
| WO | WO 99/50787 | 10/1999 |

OTHER PUBLICATIONS

Gregory Russell, IBM (Editor), Chee YM, Sent G, Yaeger L, Tremblay C, Franke K, Madhvanath M " Ink Markup Language" W3C Working Draft Aug. 6, 2003.

Kim, J. "Baseline Drift Correction of Handwritten Text", IBM Technical Dislcosure Bulletin, IBM Corp, New York, US, vol. 25, No. 10, Mar. 1, 1983, pp. 5111-5114, XP002017620 ISSN: 0018-8639.

SYSTEM FOR DETERMINING DIGITAL INK ORIENTATION

CROSS-REFERENCE TO RELATED APPLICATION

This application is a continuation of U.S. application Ser. No. 12,618,747 filed Nov. 15, 2009, now issued U.S. Pat. No. 7,894,671, which is a continuation of U.S. patent application Ser. No. 10/531,733 filed Apr. 18, 2005, now issued U.S. Pat. No. 7,630,553 which is a national phase (371) of PCT/AU03/01342, filed on Oct. 10, 2003, all of which are herein incorporated by reference.

TECHNICAL FIELD

The present invention broadly relates to pen-based computing systems and handwriting (digital ink) recognition systems, and in particular, to a method of estimating the orientation of a segment of digital ink generated using a pen-based computing system, and to a pen-based computing system for estimating the orientation of a segment of digital ink. The estimated orientation of the segment of digital ink can then be subsequently used in a digital ink line orientation normalization technique.

CROSS REFERENCES

Various methods, systems and apparatus relating to the present invention are disclosed in the following co-pending applications filed by the applicant or assignee of the present invention. The disclosures of all of these co-pending applications are incorporated herein by cross-reference.
5 Oct. 2002: Australian Provisional Application 2002952259 "Methods and Apparatus (NPT019)".
15 Oct. 2002: PCT/AU02/01391, PCT/AU02/01392, PCT/AU02/01393, PCT/AU02/01394 and PCT/AU02/01395.
26 Nov. 2001: PCT/AU01/01527, PCT/AU01/01528, PCT/AU01/01529, PCT/AU01/01530 and PCT/AU01/01531.
11 Oct. 2001: PCT/AU01/01274.
14 Aug. 2001: PCT/AU01/00996.
27 Nov. 2000: PCT/AU00/01442, PCT/AU00/01444, PCT/AU00/01446, PCT/AU00/01445, PCT/AU00/01450, PCT/AU00/01453, PCT/AU00/01448, PCT/AU00/01447, PCT/AU00/01459, PCT/AU00/01451, PCT/AU00/01454, PCT/AU00/01452, PCT/AU00/01443, PCT/AU00/01455, PCT/AU00/01456, PCT/AU00/01457, PCT/AU00/01458 and PCT/AU00/01449.
20 Oct. 2000: PCT/AU00/01273, PCT/AU00/01279, PCT/AU00/01288, PCT/AU00/01282, PCT/AU00/01276, PCT/AU00/01280, PCT/AU00/01274, PCT/AU00/01289, PCT/AU00/01275, PCT/AU00/01277, PCT/AU00/01286, PCT/AU00/01281, PCT/AU00/01278, PCT/AU00/01287, PCT/AU00/01285, PCT/AU00/01284 and PCT/AU00/01283.
15 Sep. 2000: PCT/AU00/01108, PCT/AU00/01110 and PCT/AU00/01111.
30 Jun. 2000: PCT/AU00/00762, PCT/AU00/00763, PCT/AU00/00761, PCT/AU00/00760, PCT/AU00/00759, PCT/AU00/00758, PCT/AU00/00764, PCT/AU00/00765, PCT/AU00/00766, PCT/AU00/00767, PCT/AU00/00768, PCT/AU00/00773, PCT/AU00/00774, PCT/AU00/00775, PCT/AU00/00776, PCT/AU00/00777, PCT/AU00/00770, PCT/AU00/00769, PCT/AU00/00771, PCT/AU00/00772, PCT/AU00/00754, PCT/AU00/00755, PCT/AU00/00756 and PCT/AU00/00757.
24 May 2000: PCT/AU00/00518, PCT/AU00/00519, PCT/AU00/00520, PCT/AU00/00521, PCT/AU00/00522, PCT/AU00/00523, PCT/AU00/00524, PCT/AU00/00525, PCT/AU00/00526, PCT/AU00/00527, PCT/AU00/00528, PCT/AU00/00529, PCT/AU00/00530, PCT/AU00/00531, PCT/AU00/00532, PCT/AU00/00533, PCT/AU00/00534, PCT/AU00/00535, PCT/AU00/00536, PCT/AU00/00537, PCT/AU00/00538, PCT/AU00/00539, PCT/AU00/00540, PCT/AU00/00541, PCT/AU00/00542, PCT/AU00/00543, PCT/AU00/00544, PCT/AU00/00545, PCT/AU00/00547, PCT/AU00/00546, PCT/AU00/00554, PCT/AU00/00556, PCT/AU00/00557, PCT/AU00/00558, PCT/AU00/00559, PCT/AU00/00560, PCT/AU00/00561, PCT/AU00/00562, PCT/AU00/00563, PCT/AU00/00564, PCT/AU00/00565, PCT/AU00/00566, PCT/AU00/00567, PCT/AU00/00568, PCT/AU00/00569, PCT/AU00/00570, PCT/AU00/00571, PCT/AU00/00572, PCT/AU00/00573, PCT/AU00/00574, PCT/AU00/00575, PCT/AU00/00576, PCT/AU00/00577, PCT/AU00/00578, PCT/AU00/00579, PCT/AU00/00581, PCT/AU00/00580, PCT/AU00/00582, PCT/AU00/00587, PCT/AU00/00588, PCT/AU00/00589, PCT/AU00/00583, PCT/AU00/00593, PCT/AU00/00590, PCT/AU00/00591, PCT/AU00/00592, PCT/AU00/00594, PCT/AU00/00595, PCT/AU00/00596, PCT/AU00/00597, PCT/AU00/00598, PCT/AU00/00516, PCT/AU00/00517 and PCT/AU00/00511.

BACKGROUND ART

Digital ink processing systems must deal with the huge variability in handwriting and drawing that occurs due to the differing styles of individual writers. As a result, most systems perform a number of pre-processing steps to limit this variation. Examples of such systems include handwriting recognition systems, digital signature verification systems, document analysis systems, and digital ink searching systems.

An instance of such a procedure is orientation normalization which is used to reduce the variance of the input by aligning the digital ink as if it was written using a standard orientation on the page (for example, written left-to-right on a horizontal line for Latin character based scripts). By aligning the digital ink in such away, the ink processing system can ignore the effects of variation in orientation, and as such can be made simpler, more robust, and more accurate.

Orientation normalization is usually performed as one of the first steps in a digital ink processing system, and is used to minimize error in later stages (for example, line, word, and character segmentation, feature extraction, etc.) Generally, the angle of a segment of digital ink relative to a standard reference angle (e.g. horizontal) is estimated and used to re-orient the digital ink such that the angle of digital ink matches the reference angle.

Orientation normalization for Latin character scripts is often performed using baseline correction; where the baseline of a line of text is defined as the imaginary natural line on which a user places characters that do not have descenders (e.g. "a", "b", "c", "d", "e", "f", "h", etc.). This is done by estimating the baseline of a segment of digital ink and then rotating the ink to be horizontal. Whilst most systems assume baselines are roughly linear, some systems attempt to model baseline drift using more sophisticated models such as splines [A. Hennig, N. Sherkat, and R. Whitrow, "Zone Estimation for Multiple Lines of Handwriting using Approximating Spline Functions", Fifth International. Workshop on Frontiers in Handwriting Recognition (IWFHR), pp. 325-328, September 1996].

A significant amount of research has been performed on orientation estimation and normalization for digital ink, with particular emphasis on techniques that are applicable to Optical Character Recognition systems. Early research systems relied on heuristics and empirical thresholds [W. Guerfali and R. Plamondon, "Normalization and restoring on-line handwriting", Pattern Recognition, 26 (3), pp. 419-431, 1993; S. Madhvanath and V. Govindaraju, "Using holistic features in handwritten word recognition", United States Postal Services (USPS), pp. 183-198, 1992], along with simple techniques such as linear regression through stroke minima [R. Bozinocic and S. Srihari, "Off-line cursive script word recognition"; IEEE Transactions of Pattern Analysis and Machine Intelligence 11, pp. 69-83, 1989]. Due to the brittle nature of these techniques, more sophisticated systems using projection profiles [A. Vinciarelli and J. Luettin, "A New Normalization Technique for Cursive Handwritten Words", Pattern Recognition Letters 22, pp. 1043-1050, 2001; M. Brown and S. Ganapathy, "Preprocessing Techniques for Cursive Script Word' Recognition", Pattern Recognition 16 (5), pp. 447-458, 1983] and generalized projections [G. Nicchiotti and C. Scagliola, "Generalised Projections: a Tool for Cursive Handwriting Normalisation", Fifth International Conference on Document Analysis and Recognition (ICDAR), September 1999] were developed. Other techniques have since been developed, including: least squares and weighted least-squares [M. Morita, S. Games, J. Facon, F. Bortolozzi, and R. Sabourin, "Mathematical Morphology and Weighted Least Squares to Correct Handwriting Baseline Skew", Fifth International Conference on Document Analysis and Recognition (ICDAR), pp. 430-433, September 1999; T. Breuel, "Robust least square baseline fording using a branch and bound algorithm", Proceedings of the SPIE, pp. 20-27, 2002], geometric modelling and pseudo-convex hull [M. Morita, F. Bortolozzi, J. Facon, and R. Sabourin, "Morphological approach of handwritten word skew correction", SIBGRAPI'98, International Symposium on Computer Graphics, Image Processing and Vision, Rio de Janeiro, Brazil, pp. 456-461, October 1998], techniques based on the Hough transform [A. Rosenthal, J. Hu and M. Brown, "Size and orientation normalization of on-line handwriting using Hough transform", ICASSP'97, Munich, Germany, April 1997], model based methods [Y. Bengio and Y. LeCun, "Word normalization for on-line handwritten word recognition", Proceedings of the International Conference on Pattern Recognition, pp. 409-413, October 1994], skew detection using Principal Component Analysis [Steinherz, N., Intrator, and E. Rivlin. "Skew detection via principal components analysis", Proceedings of the International Conference on Document Analysis and Recognition (ICDAR), pp. 153-156, 1999], and baseline estimation using approximating spline functions [A. Hennig, N. Sherkat, and R. Whitrow, "Zone Estimation for Multiple Lines of Handwriting using Approximating Spline Functions", Fifth International. Workshop on Frontiers in Handwriting Recognition (IWFHR), pp. 325-328, September 1996].

Some orientation normalization techniques have been disclosed in prior art patent specifications, including the use of boundary projections combined with the Hough transform [T. Syeda-Mahmood, "Method of grouping handwritten word segments in handwritten document images", U.S. Pat. No. 6,108,444]; a system for digit normalization of scanned images that works by finding the bounds of a parallelogram that completely encloses the character image [R. Vogt, "Handwritten digit normalization method", U.S. Pat. No. 5,325,447; 3]; methods that use linear projection and a clustering algorithm to detect elements in a histogram that correspond to ascender, descender, and base lines [W. Bruce, et al, "Estimation of baseline, line spacing and character height: for handwriting recognition", U.S. Pat. No. 5,396,566; J. Kim, "Baseline Drift Correction of Handwritten Text", IBM Technical Disclosure Bulletin 25 (10), Mar. 1983]; and a least squares calculation combined with rotation around a centroid for the normalization of signatures [F. Sinden and G. Wilfong, "Method of normalizing handwritten symbols", U.S. Pat. No. 5,537,489] in an online signature verification system.

Whilst the techniques described above are sometimes effective, they suffer from a number of significant limitations. For example, many assume that all lines of written text are oriented at the same angle on the page, and thus cannot handle pages of arbitrarily rotated text lines. Other limitations include the fact that the algorithms require significant processing resources (e.g. Hough transform), are quantized (e.g. Hough transform), do not work well for short segments of text (e.g. projection methods), are brittle due to empirically estimated thresholds (heuristic and rule-based techniques), or are sensitive to ascenders, descenders and outliers (e.g. least squares regression and projection techniques).

The azimuth of a writing implement is defined in [R. Poyner, "Wintab Interface Specification 1.1: 16- and 32-bit API Reference" LCS/Telegraphics] as the "clockwise rotation of the cursor about the z axis through a full circular range". In other words, if x and y define the horizontal and vertical axes of a sheet of paper, and z defines the axis that is normal to the paper, the azimuth is the rotation of the pen about the z axis. Some pen-based computing systems are able to measure the azimuth of a writing implement during the generation of digital ink, including Wacom graphics tablets and Netpage pens [K. Silverbrook et al, "Sensing Device", WO 02/42989].

DISCLOSURE OF INVENTION

In the preferred embodiment, the invention is configured to work with the Netpage networked computer system, a detailed description of which is given in our co-pending applications, including in particular PCT application WO0242989 entitled "Sensing Device" filed 30 May 2002, PCT application WO0242894 entitled "Interactive Printer" filed 30 May 2002, PCT application WO0214075 "Interface Surface Printer Using Invisible Ink" filed 21 Feb. 2002, PCT application WO0242950 "Apparatus For Interaction With A Network Computer System" filed 30 May 2002, and PCT application WO03034276 entitled "Digital Ink Database Searching Using Handwriting Feature Synthesis" filed 24 Apr. 2003. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the Netpage system provides an interactive paper-based interface to online information by utilizing pages of invisibly coded paper and an optically imaging pen. Each page generated by the Netpage system is uniquely identified and stored on a network server, and all user interaction with the paper using the Netpage pen is captured, interpreted, and stored. Digital printing technology facilitates the on-demand printing of Netpage documents, allowing interactive applications to be developed. The Netpage printer, pen, and network infrastructure provide a paper-based alternative to traditional screen-based applications and online publishing services, and supports user-interface functionality such as hypertext navigation and form input.

Typically, a printer receives a document from a publisher or application provider via a broadband connection, which is printed with an invisible pattern of infrared tags that each encodes the location of the tag on the page and a unique page identifier. As a user writes on the page, the imaging pen decodes these tags and converts the motion of the pen into digital ink. The digital ink is transmitted over a wireless channel to a relay base station, and then sent to the network for processing and storage. The system uses a stored description of the page to interpret the digital ink, and performs the requested actions by interacting with an application.

Applications provide content to the user by publishing documents, and process the digital ink interactions submitted by the user. Typically, an application generates one or more interactive pages in response to user input, which are transmitted to the network to be stored, rendered, and finally printed as output to the user. The Netpage system allows sophisticated applications to be developed by providing services for document publishing, rendering, and delivery, authenticated transactions and secure payments, handwriting recognition and digital ink searching, and user validation using biometric techniques such as signature verification.

Generally, the present invention seeks to provide a method for estimating the orientation of a segment of digital ink using pen orientation information. In one form, the technique involves using training data to build a pen orientation model, which can be for an individual writer, which is used to estimate the orientation of subsequently written digital ink.

The digital ink orientation estimation technique described herein seeks to overcome or ameliorate the limitations described in the prior art, and improve on current techniques by utilizing pen orientation information that has been previously unavailable or ignored by other systems. Additionally, one form of the invention can use training data to generate a writer-dependent pen orientation model that is used during orientation estimation.

In a broad form the present invention provides a method of estimating the orientation of a segment of digital ink, the method including the steps of: measuring the azimuth of the pen at a sampling rate during writer generation of the segment of digital ink; and estimating the orientation of the segment of digital ink using the measured azimuth of the pen at sampled points.

Preferably, the estimated orientation of the segment of digital ink is subsequently used in a digital ink line orientation normalization technique. In accordance with specific embodiments, a single, fixed orientation estimation is utilised for a line of digital ink, or, an orientation estimation that varies across a line of digital ink is utilised.

According to a further possible form of the invention, the orientation of the pen at sampled points is estimated by subtracting the mean azimuth of a digital ink training sample from the measured azimuth of the sampled points, and normalizing the estimated orientation to be within the range of 0° to 360°.

According to other specific embodiments, the segment of digital ink is more than one character of digital ink. Also, the segment of digital ink may be a line segment. In this form, line segmentation may be performed by measuring a change in azimuth value.

In yet further specific embodiments of the present invention, the orientation estimation uses a writer independent handwriting model; the orientation estimation uses a writer dependent handwriting model trained using sample digital ink input by the writer; or the writer dependent handwriting model is trained using sample digital ink input by the writer using a consistent baseline.

In a further broad form the present invention provides a pen-based computing system for estimating the orientation of a segment of digital ink, the system including a pen-based computing pen to input digital ink, and a processor adapted to estimate the orientation of a segment of digital ink by measuring the azimuth of the pen at a sampling rate during writer generation of the segment of digital ink, and estimating the orientation of the segment of digital ink using the measured azimuth of the pen at sampled points.

In still yet a further broad form the present invention provides a pen-based computing system for estimating the orientation of a segment of digital ink, the system including:
(1) a pen-based computing pen to input digital ink;
(2) a storage unit to store a handwriting model;
(3) a processor, the processor being adapted to:
  (a) retrieve the handwriting model;
  (b) receive a measurement of the azimuth of the pen at a sampling rate during writer generation of the segment of digital ink; and
  (c) estimate the orientation of the segment of digital ink by modifying the measured azimuth of the pen at sampled points using the handwriting model.

BRIEF DESCRIPTION OF FIGURES

The present invention should become apparent from the following description, which is given by way of example only, of a preferred but non-limiting embodiment thereof, described in connection with the accompanying figures.

MODES FOR CARRYING OUT THE INVENTION

The following modes are described as applied to the description and claims in order to provide a more precise understanding of the subject matter of the present invention.

Azimuth Measurements

A digitizing tablet was used to measure the azimuth of a pen during the generation of handwriting by five different writers. Digital ink was collected using a Wacom Intuos graphics tablet with a sampling rate of 100 Hz. The data collection application was developed using the Wintab Programmer Development Kit Version 1.26 [R. Poyner, "Wintab Interface Specification 1.1: 16- and 32-bit API Reference", LCS/Telegraphics, May 9, 1996].

Figure 1:
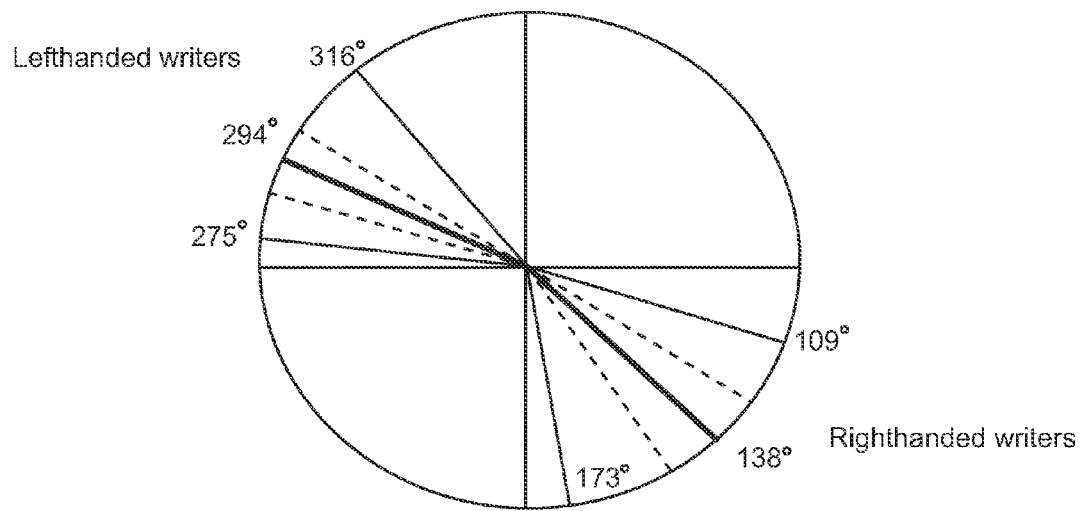
FIG. 1 illustrates the average (bold), minimum, maximum, and standard deviation (dashed) azimuth measurements for left-handed and right-handed writers.

Table 1 details the azimuth measurements for the sample data collected, where the angles are measured clockwise with 0° representing a vertical line pointing to the top of the page. Note that the azimuth measurements reveal that writer 2 is left-handed. Table 2 details the average, minimum, maximum, and standard deviation of the azimuth measurements for the sample data for both left- and right-handed writers, with this data illustrated in FIG. 1.

TABLE 1

Average, minimum and maximum azimuth measurements

| | Handedness | Average | Minimum | Maximum |
|---|---|---|---|---|
| Writer 1 | Right | 130° | 109° | 148° |
| Writer 2 | Left | 294° | 275° | 316° |
| Writer 3 | Right | 149° | 124° | 173° |
| Writer 4 | Right | 141° | 123° | 157° |
| Writer 5 | Right | 133° | 119° | 159° |

TABLE 2

Average, standard deviation, minimum and maximum measurements

| Handedness | Average | Std. Deviation | Minimum | Maximum |
|---|---|---|---|---|
| Right | 138° | 11.9° | 109° | 173° |
| Left | 294° | 8.2° | 275° | 316° |

As can be noted from the results the azimuth of a pen during handwriting is relatively stable for a particular writer (as can be seen by the small standard deviation and difference in the minimum and maximum values).

Orientation Estimation

Figure 2:
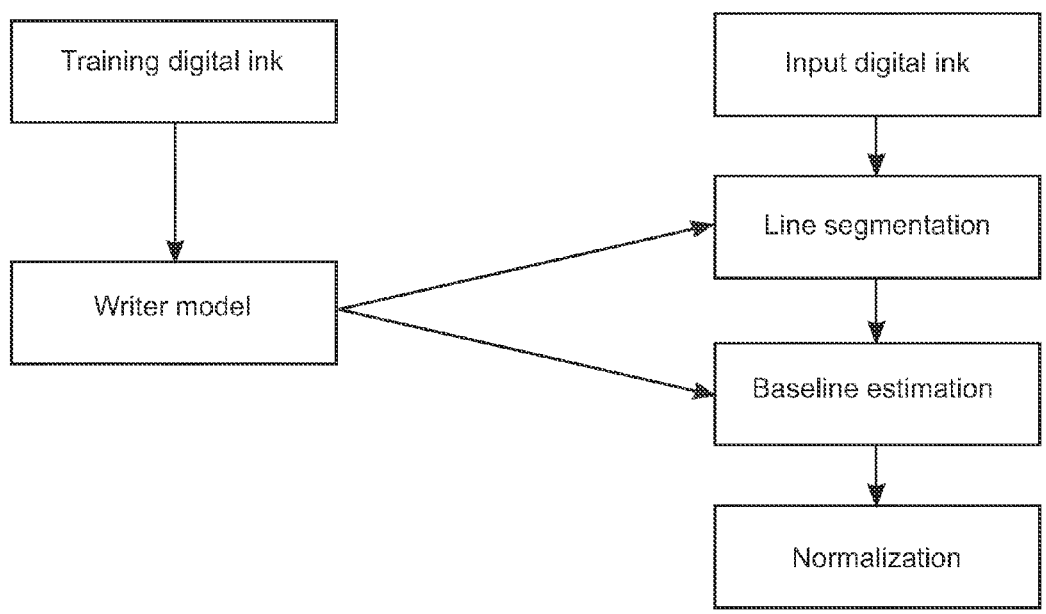
FIG. 2 illustrates the training and normalization procedure.

To estimate the orientation of digital ink using the azimuth measurements, a handwriting model is required to be available. Whilst the technique works with a small number of writer-independent models (e.g. one for left-handed writers and another for right-handed writers) that do not require training, more accurate results are achieved using a writer-dependent model that is trained using sample input from the writer. To do this, the system is trained using digital ink data that was written using a consistent, well-defined baseline. This data can be derived from normal input (for example, form input data that is constrained to be written horizontally) or from a separate training procedure. The training data is then used to generate a model for the writer as shown in FIG. 2.

Alternatively, training can occur using arbitrary handwritten input (i.e. without explicit training data) by using an alternative orientation estimation technique to truth the data from which the writer-dependent model is generated. Since the training data does not need to be large (a few letters can be sufficient), the technique used to truth the data can be very expensive (processor intensive) since it is only run once on a small segment of ink. In addition to this, algorithms that fail in some situations can be used, since a single successful orientation estimation is all that is required for the training procedure.

Once the model has been generated, it can be used for line segmentation and orientation estimation and normalization. When performing line segmentation, a large jump in the azimuth value (e.g. a value larger than the expected variance as given by the writer-specific model) is an indication of the start of a new line of text with an orientation different from that of the previous line. For orientation normalization, the model can be used to generate an estimate of the text orientation for the line segment, which is then used to perform baseline normalization.

Figure 3:
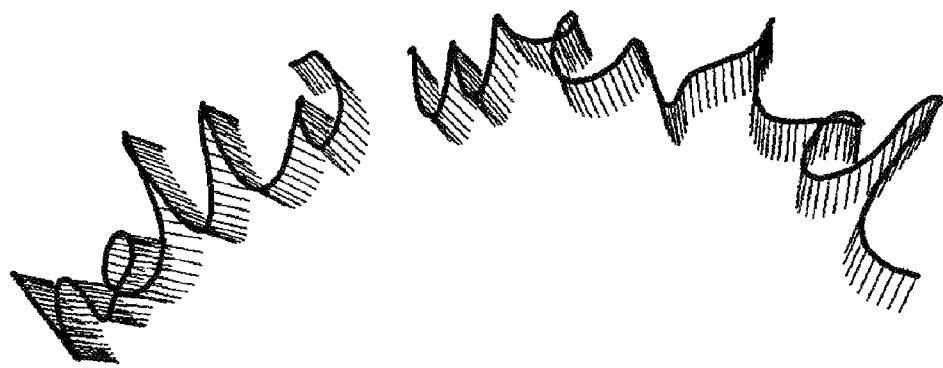
FIG. 3 illustrates measured azimuth vectors of the pen at a sampling rate during writer generation of the segment of digital ink.

As an example, FIG. 3 depicts the measured azimuth vectors for a stream of digital ink handwriting of "hello world". The vectors represent the orientation of the pen during the generation of the ink, and the angle of the pen relative to the page can be seen to change smoothly during the writing. To estimate the orientation of the digital ink in this example, a simple mean azimuth model was used, where the mean of the azimuth values in a set of training data (a single horizontal line of text written by the same writer) was calculated and stored:

$$\bar{a} = \frac{\sum_{i=1}^{n} a_i}{n} \qquad (1)$$

where $a_i$ is the azimuth measurement in degrees at sample i, and n is the number of samples in the digital ink.

The mean value represents the normal azimuth that the writer holds the pen relative to the page when writing. To estimate the orientation at each sample point, the mean values were subtracted from the azimuth values of the digital ink example shown in FIG. 3, with the results normalized to ensure they are in the range 0°-360°:

$$a_i = \begin{cases} a_i - \bar{a} + 360° & a_i - \bar{a} \leq 0° \\ a_i - \bar{a} & \text{otherwise} \end{cases} \qquad (2)$$

where $a_i$ is the azimuth measurement in degrees at sample i, and $\bar{a}$ is the mean azimuth value for the writer (as calculated previously).

Figure 4:
FIG. 4 illustrates the estimated orientation of the segment of digital ink shown in FIG. 3 after the handwriting model is applied.

The mean azimuth value derived from the training data, was approximately 130°. This value was subtracted from each of the measured azimuth values shown in FIG. 3 giving the normalized orientation estimates are shown in FIG. 4. As can be seen in FIG. 4, the estimated orientation vectors give a good indication of the curved baseline orientation for the text "hello world" at each point on the digital ink path. These orientation vectors can then be used for digital ink line orientation normalization.

Once the ink baseline orientation has been estimated, a number of digital ink line orientation normalization techniques are possible. A simple method for text written with a linear baseline is to find the mean estimated orientation of the samples in the digital ink segment, and rotate the ink to counter this orientation. More sophisticated techniques include using a smoothed running estimate of the orientation, or fitting a curve (e.g. spline) to the estimated orientation vectors and warping the digital ink segment to ensure estimated baseline is horizontal and linear.

Figure 5:
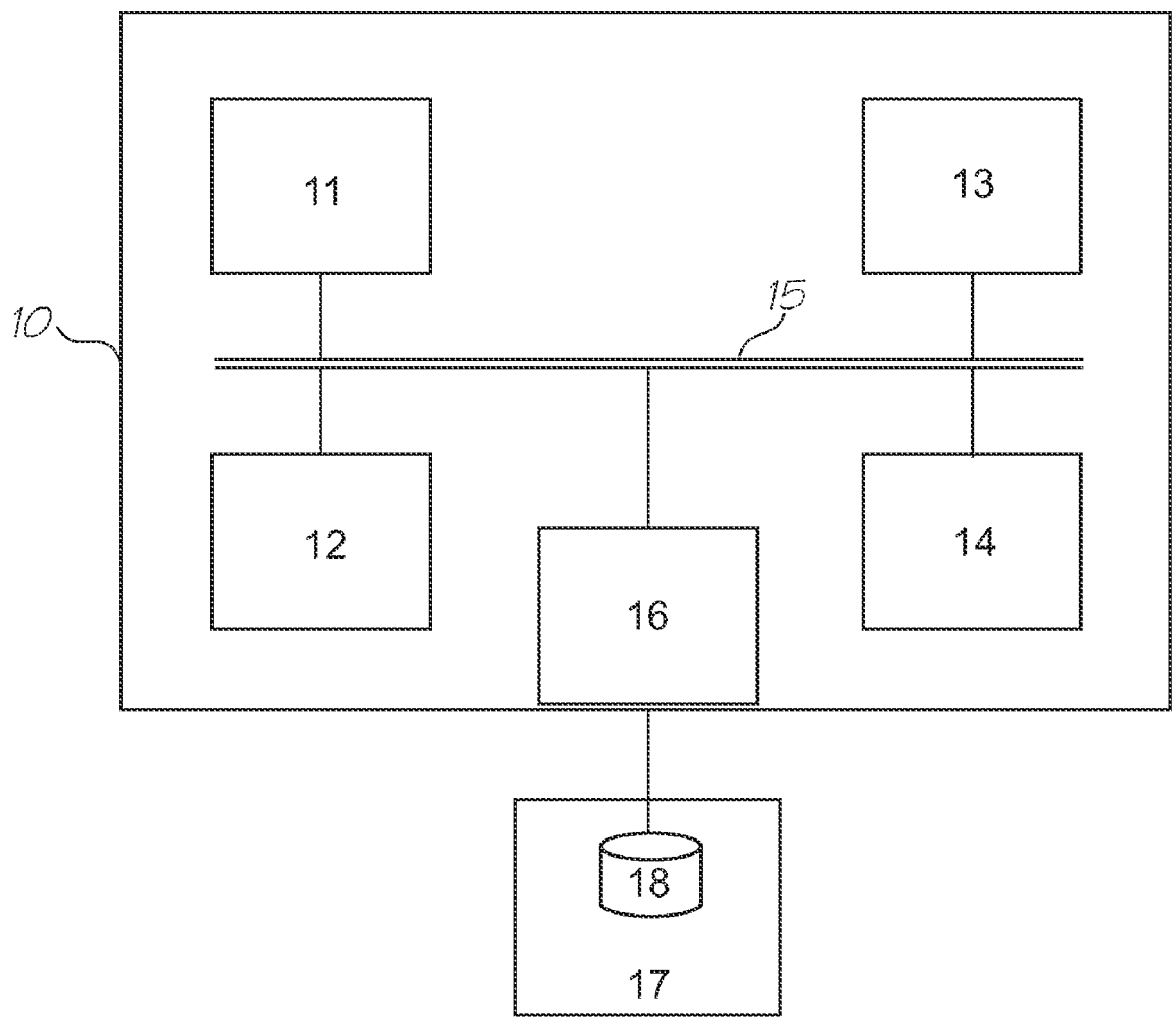
FIG. 5 illustrates a pen-based computing system.

This demonstrates a specific, but non-limiting, example method for estimating the orientation of digital ink using the azimuth of the writing device and the use of this measurement to perform orientation normalization line segmentation A further particular embodiment of the present invention can be realised using a pen-based processing system, an example of which is shown in FIG. 5. The processing system 10 generally includes at least a processor 11, a memory 12, a pen-based input device 13 and an output device 14, coupled together via a bus 15. An external interface 16 can also be provided for coupling the processing system 10 to a storage device 17 which houses a database 18. The memory 12 can be any form of memory device, for example, volatile or non-volatile memory, solid state storage devices, magnetic devices, etc. The output device 14 can include, for example, a display device, monitor, printer, etc. The storage device 17 can be any form of storage means, for example, volatile or non-volatile memory, solid state storage devices, magnetic devices, etc.

In use, the processing system 10 is adapted to allow data or information to be stored in and/or retrieved from the memory 12 and/or the database 17. The processor 11 receives instructions via the input device 13 and can display results to a user (or writer using the pen input device 13) via the output device 14. It should be appreciated that the processing system 10 may be any form of processing system, computer terminal, server, specialised hardware, or the like.

Thus, there has been provided in accordance with the present invention, a method and system for estimating the orientation of a segment of digital ink generated using a pen-based computing system.

The invention may also be said to broadly consist in the parts, elements and features referred to or indicated herein, individually or collectively, in any or all combinations of two or more of the parts, elements or features, and where specific integers are mentioned herein which have known equivalents in the art to which the invention relates, such known equivalents are deemed to be incorporated herein as if individually set forth.

Although the preferred embodiment has been described in detail, it should be understood that various changes, substitutions, and alterations can be made herein by one of ordinary skill in the art without departing from the scope of the present invention.

The invention claimed is:

1. A system for determining the orientation of digital ink, the system comprising a sensing pen and a processor configured to:
    measure the orientation of the pen during writing by the pen on a surface printed with tags, each tag encoding data on an identity of the surface associated with a digital description of the surface and on the respective location of that tag on the surface, the digital ink being generated by associating the digital description with the data encoded by the tags sensed by the pen during said writing; and
    determining the orientation of the digital ink using the measured orientation of the pen.

2. A system as claimed in claim 1, wherein the processor is configured to use the determined orientation in a digital ink line orientation normalization technique.

3. A system as claimed in claim 1, wherein the processor is configured to use a single, fixed orientation determination for a line of digital ink.

4. A system as claimed in claim 1, wherein the processor is configured to use an orientation determination that varies across a line of digital ink.

5. A system as claimed in claim 1, wherein the processor is configured to normalize the determined orientation to be within the range of 0° to 360°.

* * * * *